United States Patent

Lewis

[15] 3,704,726

[45] Dec. 5, 1972

[54] NOISE SUPPRESSING SEAT FOR A THROTTLING VALVE

[72] Inventor: Ivor J. Lewis, Aston, Pa.

[73] Assignee: Westinghouse Electric Corporation, Pittsburgh, Pa.

[22] Filed: Feb. 2, 1971

[21] Appl. No.: 111,812

[52] U.S. Cl. .......................... 137/625.3, 137/625.37
[51] Int. Cl. ........................... F15d 1/00, F16k 47/14
[58] Field of Search ....... 137/625.3, 625.37; 251/210

[56] References Cited

UNITED STATES PATENTS

| | | | |
|---|---|---|---|
| 3,602,261 | 8/1971 | Brown | 137/625.3 |
| 3,529,628 | 9/1970 | Cummins | 137/625.3 |
| 721,453 | 2/1903 | Lunken | 251/210 X |
| 3,451,404 | 6/1969 | Self | 137/625.3 X |

FOREIGN PATENTS OR APPLICATIONS

| | | | |
|---|---|---|---|
| 905,020 | 2/1954 | Germany | 251/210 |

*Primary Examiner*—Arnold Rosenthal
*Attorney*—A. T. Stratton

[57] ABSTRACT

A noise suppressing throttling plug valve having a seat ring with a plurality of right-angled ducts extending therethrough, upstream of a valve seat. As the plug rises, an increasing number of ducts are uncovered providing an increase in fluid flow through the valve. Successively uncovered ducts provide shorter fluid paths to provide a flow rate that increases as the distance the plug moves from the seat increases. The ducts cause the fluid to be broken up into discrete jets, which reduce the noise caused by high velocity fluid flowing over the seat. As the valve plug moves away from the seat, the flow through the ducts diminishes, so that as the valve plug approaches its fully open position, the flow through the ducts is minimal, thus providing a valve with a low intensity noise level when throttling and a low pressure drop when fully open.

10 Claims, 4 Drawing Figures

NOISE SUPPRESSING SEAT FOR A THROTTLING VALVE

BACKGROUND OF THE INVENTION

This invention relates to noise suppressing steam valves and more particularly to such valves having noise suppressing devices in the valve seats.

With larger and larger capacity steam turbines, the size of the throttle valve has increased to satisfy the large steam demands of the turbines. In order to control the steam flowing into the turbine, such valves necessarily operate over a wide range of pressure drops, i.e. from about 2 percent when fully open to 100 percent when closed. Pressure drops in excess of 50 percent characteristically create high intensity noise and vibration levels so that some type of noise or vibration suppressing device is normally placed in the valve, however such devices herebefore employed, normally have higher pressure drops when the valve is fully open than valves made in accordance with this invention.

SUMMARY OF THE INVENTION

In general, a throttle valve made in accordance with this invention has a body portion, fluid inlet and outlet ports, a valve seat interposed between the inlet and outlet ports, and a plug. The plug registers with the valve seat to stop fluid from flowing from the inlet to the outlet port. A ring, extending upstream of the valve seat, comprises an inner generally cylindrical surface, a plurality of ducts, and a plurality of conduits disposed therein. Each duct is in communication with at least one conduit. The ducts and conduits are so disposed that, as the plug moves away from the valve seat, fluid flows through an increasing number of ducts and conduits, and the restriction through successively activated ducts and conduits decreases by virtue of increased area of flow and shorter length of path, so that the rate of increase of flow is greater as the distance the plug moves from the valve increases to a position where the plug moves away from the ring. Upon the plug reaching fully open position, the flow through the ducts and conduits is minimal providing a minimum pressure drop across the fully open valve.

BRIEF DESCRIPTION OF THE DRAWINGS

The objects and advantages of this invention will become more apparent from reading the following detailed description in connection with the accompanying drawings, in which.

DESCRIPTION OF THE PREFERRED EMBODIMENTS

Figure 1:
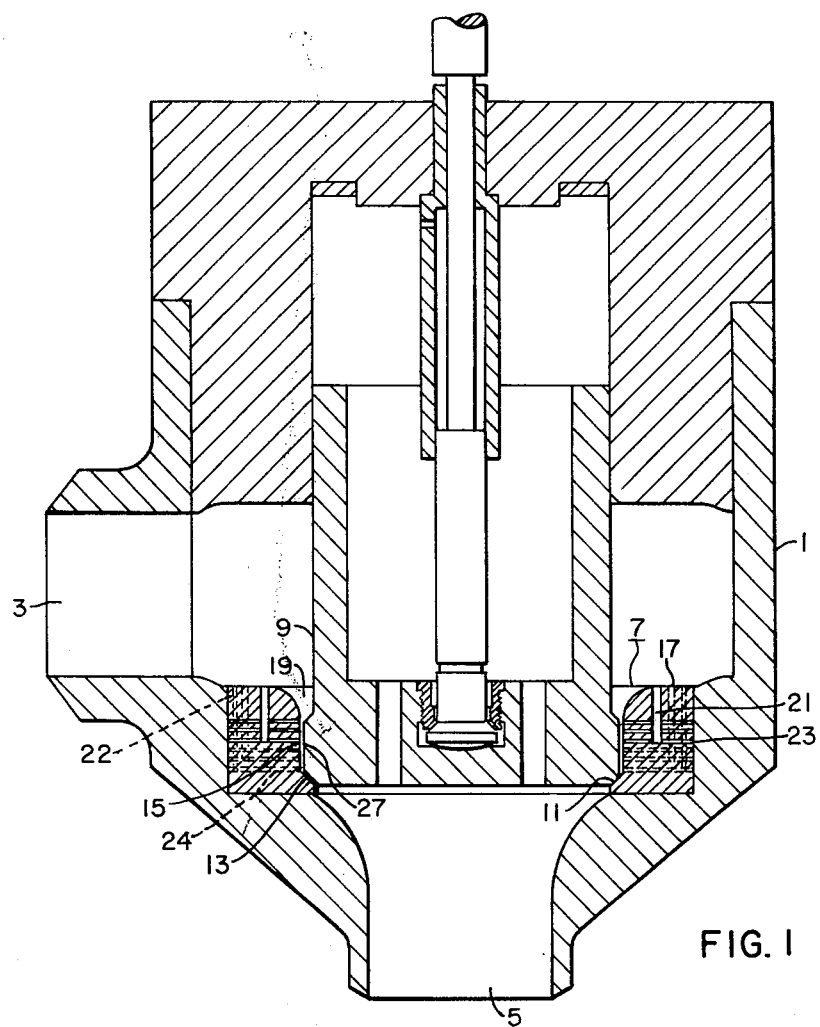
FIG. 1 is a sectional view of a portion of a plug valve incorporating this invention.
Figure 2:
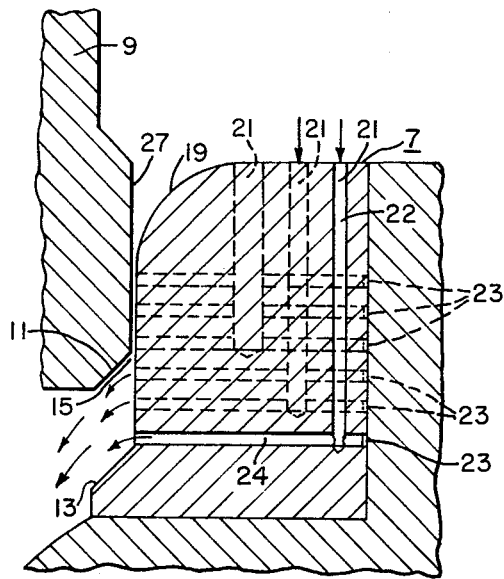
FIG. 2 is an enlarged fragmentary sectional view of a portion of the valve shown in FIG. 1, but showing a seat ring and the flow of steam when the plug is off its seat.

Referring now to the drawings in detail, FIG. 1 shows a steam throttling plug valve having a body portion 1, a fluid or steam inlet port 3, a steam or fluid outlet port 5, a seat ring insert 7, interposed between the inlet and outlet ports 3 and 5, and a reciprocable plug 9. The plug 9 has an annular seating surface 11, which registers with a mating annular valve seat or seating surface 13, disposed on the seat ring 7 to stop steam from flowing from the inlet to the outlet port. The valve seat 13, though shown made integral with the ring insert 7, may be made as a separate ring or integral with the valve body.

As shown in the drawings, the seat ring comprises an inner generally cylindrical surface 15 extending upstream of the valve seat 13, a generally radially extending upper surface 17, a segment of a generally toroidal surface 19 joining the radially extending surface and the cylindrical surface, a plurality of ducts 21 disposed in the seat ring generally parallel to the cylindrical surface 15 and a plurality of conduits 23 extending generally radially outwardly from the cylindrical surface 15. The ducts 21 are disposed in circumferentially spaced groups. Each duct in the outermost group 22 is in communication with a conduit 23 in a row of conduits 24 adjacent the seating surface 13 on the seat ring. Successive inwardly circumferentially spaced groups of ducts are in communication with conduits spaced successively greater distances from the valve seat 13. The cross-sectional area of the ducts 21 in the various groups decrease as the group's distance from the cylindrical surface 15 increases, and the number of conduits 23 with which a duct is in communication also decreases as the cross-sectional area of the duct decreases. The ducts 21 are generally round holes disposed normal to the upper surface 17. The conduits 23 are generally round holes extending radially outwardly from the cylindrical surface 15. They normally extend through the seat ring and are sealed or plugged adjacent the outer periphery 25 thereof. Thus, the ducts and conduits are at right angles to each other, and are so disposed that as the plug 9, which has a cylindrical surface 27 slightly smaller in diameter than the cylindrical surface 15, moves away from the valve seat 13 steam flows through an increasing number of ducts and conduits, and the path of the steam through successively activated ducts and conduits becomes shorter. Thus, the rate of increase of flow is greater as the distance the plug moves from the seating surface 15 increases to a position where the plug moves away from the seat ring.

Figure 3:
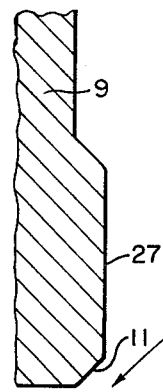
FIG. 3 is an enlarged fragmentary sectional view similar to FIG. 2, but showing the flow of steam when the plug has moved away from the seat ring.
Figure 3:
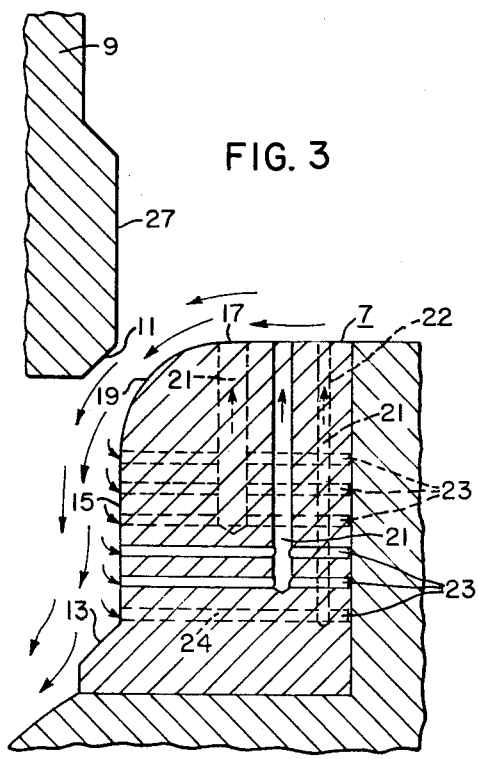
Figure 4:
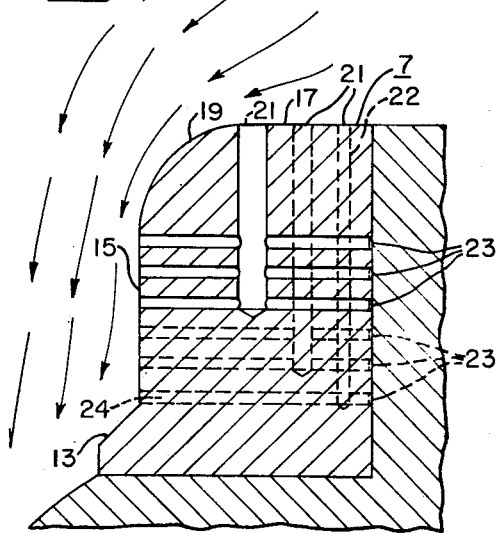
FIG. 4 is an enlarged fragmentary sectional view similar to FIG. 2, but showing the flow of steam when the plug approaches its fully open position.

As shown in FIG. 3, when the plug is only a small distance from the seat ring, steam flows over the upper surface 17 and the toroidal surface 19 causing an aspirating effect or a low pressure in the duct adjacent the upper surface so that the steam flow tends to reverse through the conduits and ducts, which results in the steam remaining close the the downstream portion of the seat ring, thus reducing turbulence, noise and vibration. When the plug approaches its wide open position, as shown in FIG. 4, the flow through the ducts and conduit is minimal, thus providing a valve having a low pressure drop when fully open.

What is claimed is:

1. A throttle valve having a body portion, a fluid inlet port and a fluid outlet port, a valve seat between said inlet and outlet ports and a plug, said plug having an annular seating surface which registers with said valve seat to stop fluid from flowing from said inlet to said outlet port, said valve also having a ring disposed upstream of of said valve seat and comprising an inner generally cylindrical surface, a plurality of ducts disposed in said ring, and a plurality of conduits disposed in said ring, each duct being in direct communication with at least one conduit and so disposed that the fluid flows in series through said ducts and their associated conduits, said plug having a generally cylindrical portion slightly smaller in diameter than the cylindrical portion of said ring, said plug being concentric with and movable relative to said ring, said ducts and conduits in said ring being so disposed that, as said plug moves away from said valve seat, fluid flows through an increasing number of ducts and conduits, and the length of said ducts and said conduits being such that the path through successively activated ducts and conduits becomes shorter, whereby the rate of increase of flow increases as the distance said plug moves from said valve increases to a position wherein said plug moves away from said ring, and said ring, ducts and conduits being so disposed within the valve that upon said plug reaching its fully open position the flow through said ducts and conduits is minimal, thereby minimizing the pressure drop across the fully open valve.

2. A valve set forth in claim 1, having the ring, ducts and conduits so disposed, relative to the flow of fluid passing the ducts and conduits, that the flow through some of the ducts and conduits is reversed, when the plug is a small distance from the ring, whereby the fluid flowing past the downstream portion of the ring remains close thereto, which results in a reduction in the turbulence in the fluid flowing past said ring, and a reduction in the noise and pressure drop resulting from the throttling of the fluid.

3. A valve as set forth in claim 1, wherein the ducts are generally parallel to the cylindrical surface of the ring and the cross sectional area of the ducts decreases as the distance from the cylindrical portion of the ring increases.

4. A valve as set forth in claim 3, wherein the number of conduits with which a duct is in communication decreases as the cross-sectional area of the ducts decreases.

5. A valve as set forth in claim 4, wherein the ducts and conduits are, generally, at right angles to each other.

6. A valve as set forth in claim 5, wherein the ducts and conduits are generally round holes.

7. A valve as set forth in claim 5, wherein the conduits are holes that extend readily through the ring and are sealed adjacent the outer periphery thereof.

8. A valve as set forth in claim 7, wherein the ducts are disposed in circumferentially spaced groups in the ring, each duct in the outermost group being in communication with a conduit in a row of conduits adjacent the valve seat and the successive inner circumferentially spaced groups of ducts are in communication with conduits in rows spaced successively greater distances from the valve seat.

9. A valve as set forth in claim 1 having a ring with a generally radially extending surface from which the ducts originate, and a segment of a generally toroidal surface joining said radially extending surface to the cylindrical surface extending upstream of the valve seat to provide a fluid flow path across said surfaces wherein the fluid flowing through some of the ducts and conduits reverses direction causing the fluid to remain close to the ring as it passes thereby when the valve plug is moved a small distance from the ring thereby causing a reduction in the turbulence of the fluid stream passing the downstream portion of the ring, a lower pressure drop across the valve and a minimal noise level.

10. A valve as set forth in claim 1, wherein the ring is integral with the valve seat.

* * * * *